April 18, 1933.　　J. H. DE BOER ET AL　　1,904,276
DRY RECTIFIER
Filed Jan. 22, 1931
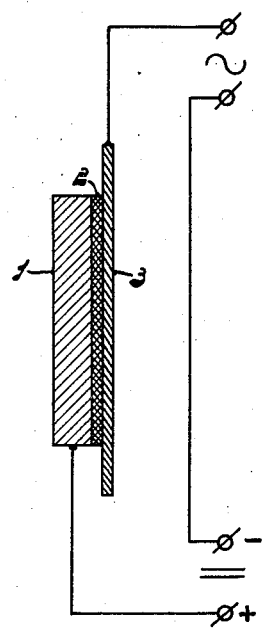
Inventors:
Jan Hendrik de Boer,
Willem Christiaan van Geel
and Hendrik Emmens,
by
Atty.

Patented Apr. 18, 1933

1,904,276

UNITED STATES PATENT OFFICE

JAN HENDRIK DE BOER, WILLEM CHRISTIAAN VAN GEEL, AND HENDRIK EMMENS, OF EINDHOVEN, NETHERLANDS, ASSIGNORS TO N. V. PHILIPS' GLOEILAMPEN-FABRIEKEN, OF EINDHOVEN, NETHERLANDS

DRY RECTIFIER

Application filed January 22, 1931, Serial No. 510,581, and in the Netherlands March 7, 1930.

The invention relates to dry rectifiers. By a dry rectifier is meant a rectifier formed by two layers of different material which are separated by a layer of solid or powdery other material. The dry rectifier according to the invention is characterized in that the anode consists, at least in part, of phosphorus. Substances which can be mixed with phosphorus are especially such substances which act as oxidizing agents for a film-forming material, such substances being, for instance, lead peroxide and $KMnO_4$. Such a rectifier has proved to possess of very satisfactory properties as regards the internal resistance and the rectifying effect.

There exist two kinds of phosphorus which are sharply defined, to wit the white and the violet phosphorus. Particularly the latter kind has favourable properties in the said respect. Further, red phosphorus (having a close resemblance to violet phosphorus) is well-known as a commercial product and has proved to be particularly suitable for use as the material for forming the anode in dry plate rectifiers.

The anode may be manufactured by pressing powdery phosphorus to a thin plate.

For the cathode of said rectifiers use may be made of materials of very different nature such as metals coated with an oxide film. Use should preferably be made of aluminium coated with a layer of an aluminium compound, for example aluminium oxide.

Among the many other metals which with an anode of phosphorus have proved to be quite satisfactory for constituting the cathode, niobium and tantalum should still be mentioned.

The drawing schematically represents by way of example a rectifier cell built up in accordance with the invention.

The plate 1 consists, for example, of zirconium on which has been formed a layer 2 of zirconia. The thin plate 3 consists of phosphorus. The current passes only in the direction from 3 to 1.

Although in the circuit-arrangement shown only one wave of the alternating current is rectified it is evident that a plurality of cells may be combined and connected in such manner that both waves are rectified.

What we claim is:

1. A dry rectifier having a cathode and an anode, in which the anode consists substantially in part of phosphorus and the cathode consists of a film-forming material having a higher conductivity and greater emissive power than phosphorus.

2. A dry rectifier having a cathode and an anode, in which the anode consists substantially in part of phosphorus and the cathode consists of a film-forming metal.

3. A dry rectifier having a cathode and an anode, in which the anode consists substantially in part of phosphorus and wherein the cathode consists of aluminium coated with a layer of an aluminium compound, forming an intermediate layer between the cathode and the anode.

4. A dry rectifier having a cathode and an anode, in which the anode consists substantially in part of red phosphorus and the cathode consists of a film-forming material having a higher conductivity and greater emissive power than red phosphorus.

5. A dry rectifier having a cathode and an anode in which the anode consists substantially in part of red phosphorus and the cathode consists of a film-forming metal.

6. A dry rectifier having a cathode and an anode in which the anode consists substantially in part of red phosphorus and wherein the cathode consists of aluminium coated with a layer of an aluminium compound, forming an intermediate layer between the cathode and anode.

In testimony whereof we have signed our names to this specification.

JAN HENDRIK DE BOER.
WILLEM CHRISTIAAN VAN GEEL.
HENDRIK EMMENS.